March 8, 1955     B. E. STERNE     2,703,710
SPRING LEAF INSERT
Filed Aug. 11, 1948
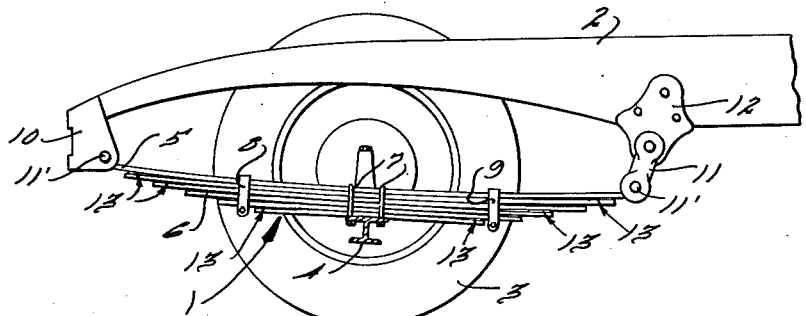
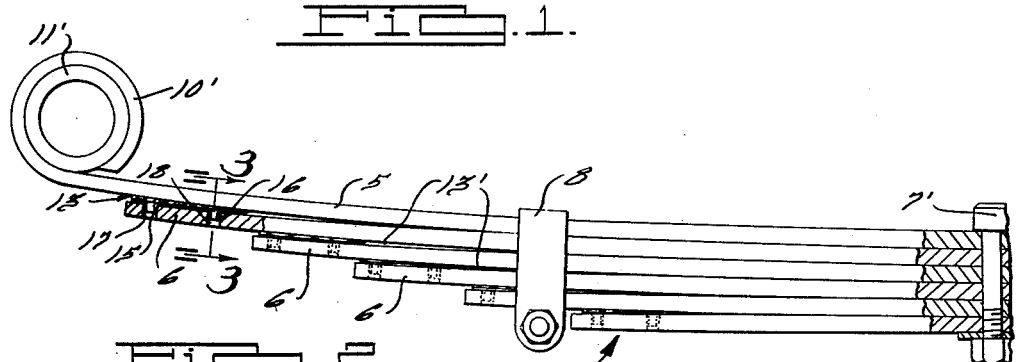
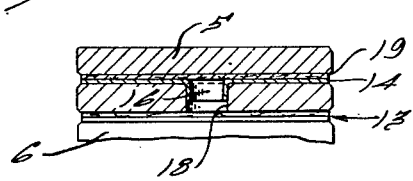
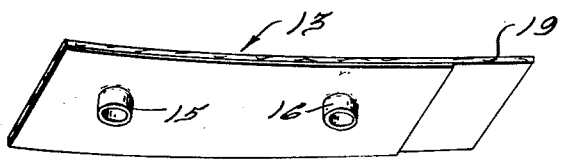
INVENTOR.
BERNHARD E. STERNE
BY
Harness and Harris
ATTORNEYS.

United States Patent Office 2,703,710
Patented Mar. 8, 1955

2,703,710
SPRING LEAF INSERT

Bernhard E. Sterne, Detroit, Mich., assignor to Chrysler Corporation, Highland Park, Mich., a corporation of Delaware Application August 11, 1948, Serial No. 43,671

2 Claims. (Cl. 267—49)

My invention relates to an improved leaf spring of the type used on vehicles and, particularly, to an improved separator for slidably supporting one of a pair of adjacent spring leaves upon the other.

An object of my invention is to provide a leaf spring with means for reducing the frictional resistance to sliding of leaves with respect to each other.

Another object of my invention is to provide a vehicle leaf spring with means for greatly reducing vibration and noise normally caused by metal-to-metal contact of the individual leaves.

Another object of my invention is to provide a separator for a leaf spring which is very readily removable from between the opposed surfaces of the adjacent leaves of the spring when so desired.

A further object of my invention is to provide a leaf spring with separators which are positioned between adjacent leaves of the spring and which comprise a metal plate anchored to one of the adjacent leaves having a non-metallic material bonded thereto and engaging the other of the adjacent leaves.

Still another object of my invention is to provide separators for leaf springs which are sufficiently flexible to conform to the curvature of opposed surfaces of adjacent leaves of the spring.

An additional object of the invention is to provide improved means for securely holding non-metallic, anti-friction material against relative movement with respect to the outer end portion of one of a pair of spring leaves while accommodating free sliding engagement of such material by the other leaf.

Other objects and advantages of my invention will become more apparent from the following description taken in connection with the accompanying drawings in which:

Fig. 1. is a fragmentary side elevation of a vehicle chassis which is equipped with a spring that embodies my invention.

Fig. 2 is a fragmentary side elevational view, partly in section, of the spring leaf shown in Fig. 1.

Fig. 3 is a transverse sectional view taken on the line 3—3 of Fig. 2.

Fig. 4 is a perspective view of my improved spring leaf separator.

In the form shown, my improved leaf spring 1 is interposed between the sprung portion of the vehicle chassis, which includes the spaced road wheels 3 that are supported by transverse axle 4. The spring 1 has a main leaf 5 and a plurality of underlined leaves 6 of varying lengths. The intermediate portion of the leaf spring is rigidly clamped upon the axle 4 by U-shaped bolts 7 which firmly hold the leaves in superimposed relation. The leaves 5 and 6 are provided at their centers with registering apertures through which a bolt 7' extends. The bolt 7' clamps the middle portions of the leaves together in metal-to-metal contact and resists all relative shifting movement of the leaves at this location. Clamping members 8 and 9 also serve to assist in holding the leaves 5 and 6 in assembled relation. The front end of the main leaf 5 is pivotally connected to the frame 2 of the chassis by a bracket 10 and the rear end of the main leaf is pivotally secured to the frame 2 by a shackle 11 which is swingably mounted on a bracket 12 depending from the frame 2. The pivotal connections between the ends of the spring 1 and the bracket 10 on link 11 are provided in a conventional manner by eyes 10' on the opposite ends of the main leaf 5 which receive pins 11'.

The outer end portions of spring leaves 6 are held in spaced relation from each other and from the main leaf 5 by separators, generally designated by the numeral 13, which are located between the respectively opposite end portions of each spring leaf and the side of the adjacent leaf. There is thus provided a tapering recess 13' between adjacent leaves having its greatest depth adjacent the inner end of the separator. The separators 13 comprise a metallic backing plate 14 of rectangular configuration having a width approximating the width of the individual leaf of the spring. The plate 14 is provided with two integrally connected outwardly extending projections 15 and 16 of hollow cylindrical configuration which are adapted to be positioned within holes 17 and 18 in the respective end portions of each leaf 6. The projections 15 and 16 are preferably formed by punching apertures in the plate 14 and simultaneously or in a separate operation, deforming the metal around the apertures into tubular shape. The plate 14 preferably comprises deformable metal which is adapted to readily conform to the different curvatures of the spring leaves under the clamping pressure or load to which the leaves are subjected. Thus the separators may be performed to a desired curvature, or inserted while flat between the leaves and brought to conformity therewith under clamping pressure or load.

The plate 14 has bonded thereto a sheet 19 of non-metallic anti-friction material which engages the lower surface of the end portion of each leaf when the separator 13 is positioned between the adjacent leaves of the spring. The size of the sheet 19 of non-metallic anti-friction material is substantially beyond the corresponding end of the plate 14 so as to fill the outer end portion of the tapered recess between adjacent leaves which results from spreading apart the outer end portions of adjacent leaves, an amount equal to the overall thickness of the separator. The extended portion of the sheet 19 prevents the admission of dirt and grit into this space.

The sheet 19 may comprise any type of conventional non-metallic anti-friction material and preferably has a solid lubricant content. It may be molded or extruded from a suitable compound such, for example, as a mixture of fibrous material, preferably asbestos fibers, finely divided particles of solid lubricant, such as graphite, and a suitable binder. The binder may comprise natural or synthetic rubber compounds, synthetic resins, asphalt or combinations of such materials. After the compound has been molded, calendered, or extruded to sheet form, it may be solidified by suitable treatment depending upon the nature of its binder content. When the binder comprises natural or synthetic rubber or thermosetting type of synthetic resin, it may be brought to a set state in a heat curing operation.

The cured sheet anti-friction material may be bonded to the sheet metal plate 14 with the aid of any suitable cement but is preferably bonded thereto by a thermosetting cement which may be brought to a set state by a heat curing operation. Adhesives of the type disclosed in United States Patent No. 2,376,854 have been found to be particularly advantageous in this bonding operation. If desired, the uncured anti-friction material may be applied to a cement coated sheet metal plate and simultaneously cured and bonded in the same heating operation.

The anti-friction material need not be provided with excessively strong physical properties, for, inasmuch as its entire side surface is intimately bonded to sheet metal, the properties of the latter may be relied upon to reinforce the anti-friction material against cracking and disintegration under the pressure and rubbing action to which it is subjected in use.

Metal plates, such as 14, are sufficiently flexible to conform to the curvatures of the opposed surfaces of adjacent spring leaves. The separators engage only limited areas of the spring leaves, and they hold the opposed surfaces of the outer end portions of adjacent leaves, including the outer extremities thereof in spaced relation. In this way, the extremities of each leaf are prevented from digging into the surfaces of the adjacent leaf and the main relative movement of the leaves, which occurs at the outer end portions thereof, is effectively lubricated. The action of the spring is thus maintained uniform and free from squeak throughout the normal life of the spring in most instances, but, if desired or needed, the separators 13 may be conveniently removed and replaced.

Although but one specific embodiment of the invention is herein shown and described, it will be understood that various changes in the details of construction and materials employed may be made without departing from the spirit of the invention.

I claim:

1. A leaf spring including a plurality of superimposed leaves having portions intermediate their ends disposed in contacting relationship, means clamingly engaging said intermediate portions of said leaves together in contacting relationship and adapted to positively hold said leaves against relative longitudinal movement, and separators between only the end portions of adjacent leaves of said spring for holding the portions of said leaves between said end portions and said intermediate contacting portions against pressure contacting engagement, each separator comprising a deformable sheet metal plate having projections extending from one side thereof for fixing it against movement relative to one leaf and including a layer of non-metallic anti-friction material surface bonded to the opposite side of said plate engaged with an adjacent leaf, said layer of anti-friction material extending toward said intermediate portion of said spring beyond an extremity of said plate.

2. A leaf spring including a plurality of superimposed leaves having portions intermediate their ends disposed in contacting relationship, means clampingly engaging said intermediate portions of said leaves together in contacting relationship and adapted to positively hold said leaves against relative longitudinal movement, and separators between only the end portions of adjacent leaves of said spring for holding the portions of said leaves between said end portions and said intermediate contacting portions against pressure contacting engagement, each separator comprising a deformable sheet metal plate member having a plurality of projections extending from one side thereof for fixing it against movement relative to one leaf and including a sheet member of non-metallic anti-friction material bonded to the opposite side of said plate to prevent a plane of slippage from developing along the interface between the sheet member of material and said plate member, and having an anti-friction wear surface engaging an adjacent leaf so as to effect a slippage area under pressure contact therewith, the sizes of said members being dissimilar such that one member extends beyond the other in the direction of the longitudinal axis of the leaf spring.

References Cited in the file of this patent

UNITED STATES PATENTS

| | | |
|---|---|---|
| 1,127,511 | Potter | Feb. 9, 1915 |
| 1,845,096 | Nowalk | Feb. 16, 1932 |
| 2,029,366 | Geyer | Feb. 4, 1936 |
| 2,280,201 | Thompson | Apr. 21, 1942 |
| 2,299,873 | Beckel | Oct. 27, 1942 |
| 2,319,172 | Watson | May 11, 1943 |
| 2,346,092 | Tollzien | Apr. 4, 1944 |
| 2,476,367 | Guernsey | July 19, 1949 |
| 2,621,922 | Watson | Dec. 16, 1952 |
| 2,663,563 | Watson | Dec. 22, 1953 |